US005235427A

United States Patent [19]

Kim

[11] Patent Number: 5,235,427

[45] Date of Patent: Aug. 10, 1993

[54] CAMCORDER AND METHOD OF CONTROLLING RECORDING IN ACCORDANCE WITH SHAKING OF THE CAMCORDER

[75] Inventor: Cheol Y. Kim, Seoul, Rep. of Korea

[73] Assignee: Gold Star Co., Ltd., Rep. of Korea

[21] Appl. No.: 782,538

[22] Filed: Oct. 25, 1991

[30] Foreign Application Priority Data

Oct. 31, 1990 [KR] Rep. of Korea ............... 17646/1990

[51] Int. Cl.$^5$ ............................................ H04N 5/228

[52] U.S. Cl. ..................................... 358/222; 354/430

[58] Field of Search ............... 358/222, 909, 906, 229, 358/209; 354/430

[56] References Cited

U.S. PATENT DOCUMENTS 4,492,452 1/1985 Suzuki et al. ....................... 354/430
4,695,905 9/1987 Utsugi ................................ 358/909
4,885,643 12/1989 Ichimura et al. ................... 358/229
4,999,662 3/1991 Bryant ................................ 354/412
5,012,270 3/1991 Sekine et al. ....................... 354/430
5,053,875 10/1991 Ishii et al. ......................... 358/222

*Primary Examiner*—Michael T. Razavi
*Assistant Examiner*—Wendy R. Greening
*Attorney, Agent, or Firm*—Poms, Smith, Lande & Rose

[57] ABSTRACT

The present invention relates generally to a method and apparatus for detecting a shaking condition of a camcorder, and temporarily halting or suspending operation of the camcorder while the camcorder is shaking excessively. The present invention employs counters that are incremented by a mercury switch shaking detector mounted on the camcorder. The count is compared to a predetermined count limit. If the count exceeds the count limit, an excessive shaking condition is established. Recording of the camcorder is temporarily halted accordingly. Further, the counters are reset after predetermined time intervals.

11 Claims, 3 Drawing Sheets 16
15
KEY INPUT
13
DECK
19
AUDIO PROCESSING
11
SHAKING SENSING
12
CONTROL PORTØ
17
CAMERA PROCESSING
14
SERVO
18
Y/C PROCESSING 6
AUDIO PROCESSING
3
DECK
1
KEY INPUT
2
CONTROL
4
CAMERA PROCESSING
7
SERVO
5
Y/C PROCESSING 16
15
KEY INPUT
13
DECK
19
AUDIO PROCESSING
11
SHAKING SENSING
12
CONTROL
PORTØ
17
CAMERA PROCESSING
14
SERVO
18
Y/C PROCESSING

CAMCORDER AND METHOD OF CONTROLLING RECORDING IN ACCORDANCE WITH SHAKING OF THE CAMCORDER

BACKGROUND OF THE INVENTION

1. Field of the Invention

The present invention relates in general to a camcorder, and more particularly to a camcorder having a function of sensing shaking of the camcorder, regarding it as an error recording that the sensed shaking of the camcorder is beyond a predetermined reference level and automatically stopping the operation of the camcorder temporarily in accordance with the regarded result, and to a method of controlling recording in accordance with shaking of the camcorder.

2. Description of the Prior Art

Generally, recording of a camcorder is performed beginning with selection of a recording button by the user upon power-on of the camcorder. The user begins to record a desired image, keeping a certain distance from the image, using the camcorder and then pushes a stop button on the camcorder to complete the recording of the image.

On the other hand, when the user moves the camcorder quickly here and there to take the subsequent scenes, he or she selects a temporary stop button to stop the operation of the camcorder temporarily and then changes the operation of the camcorder to the recording mode again at the desired time.

With reference to FIG. 1, there is shown a block diagram of a conventional control apparatus for stopping temporarily the operation of a camcorder. The illustrated apparatus comprises a key input unit 1 for inputting a key signal being selected by the user, a control unit 2 for inputting an output signal from the key input unit 1 and outputting a plurality of control signals in response to the output signal from the key input unit 1, a deck unit 3 for controlling loading/unloading of a VCR tape in accordance with an output signal from the control unit 2, a camera processing unit 4 for outputting an image signal being inputted through a camera lens (not shown) to the control unit 2, a Y/C processing unit 5 for image-processing the image signal in accordance with an output signal from the control unit 2 such that the image signal is recorded on the VCR tape or the recorded image signal is played back, an audio processing unit 6 for recording an audio signal being inputted through a camcorder mike (not shown) on the VCR tape in accordance with an output signal from the control unit 2, and a servo unit 7 for controlling traveling of the VCR tape in accordance with an output signal from the control unit 2.

The operation of the conventional control apparatus with the above-mentioned construction will now be described.

First, if the key input unit 1 inputs a key signal corresponding to a power-on and recording mode, the control unit 2 outputs a plurality of control signals necessary to the operation of the camcorder in response to the input state of the key input unit 1. The recording operation of the camcorder in accordance with the control signals form the control unit 2 will be performed as follows:

When the recording key signal is inputted for performing of the recording mode of the camcorder, the deck unit 3 performs the loading operation of the VCR tape. Also, the image signal being inputted through the camera lens is recorded on the magnetic VCR tape by the Y/C processing unit 5. At this time, the servo unit 7 controls the traveling of the camcorder, i.e., speeds and phases of capstan and reel motors (not shown) in the camcorder.

On the other hand, the audio signal being inputted through the external mike is recorded on the magnetic VCR tape by the audio processing unit 6. Herein, the audio and Y/C processing units 6 and 5 record the audio and image signals on the VCR tape utilizing a FM manner.

When the user would like to stop the recording operation of the camcorder during performing of the recording mode of the camcorder, he or she selects a pause key or a stop key. Upon selection of the pause key or stop key, the control unit 2 changes the operation of the camcorder to the temporary stop mode or a stop mode. On the other hand, when the user frequently moves the camcorder to take the subsequent scenes with an irregular time lag, he or she selects the temporary stop mode and then releases the temporary stop mode to take the desired scene at the desired place and time, for the purpose of reduction of the delay time.

However, the convention control apparatus has a disadvantage as follows:

The user frequently moves the camcorder to take the subsequent scenes with an irregular time lag. At this time, the user selects the temporary stop mode in order to more the camcorder to take the next scene. However, when the user moves the camcorder to take the next scene, with failing to select the temporary stop mode through his or her carelessness, the operation of the camcorder continues to be performed in the recording mode. As a result, undesired scenes may be recorded by the camcorder. The conventional control apparatus may be shown by manufactured goods, Model GS-V3M and Model GS-V31M, available from Gold Star Co., Ltd. Korea.

SUMMARY OF THE INVENTION

Therefore, the present invention has been made in view of the above problem, and it is an object of the present invention to provide a camcorder for sensing its shaking number of times by means of shaking sensing means when the user moves the camcorder to take the next scene, with failing to select a temporary stop mode through his or her carelessness, regarding it as an error recording that the sensed shaking number of times is beyond a predetermined reference number of times and automatically stopping its operation temporarily in accordance with the regarded result.

It is another object of the present invention to provide a method of controlling recording in accordance with shaking of a camcorder.

In accordance with one aspect of the present invention, there is provided a camcorder comprising: shaking sensing means for sensing shaking of the camcorder and outputting a signal in accordance with the sensed result; key input means for inputting a key signal, corresponding to an operation mode of the camcorder, being selected by the user; control means for outputting a plurality of control signals in response to output signals from said shaking sensing means and said key input means; deck means for controlling loading/unloading of a VCR tape under a control of said control means; servo means for controlling traveling of the VCR tape under a control of said control means; and image and audio processing means for changing image and audio signals being inputted therein to recordable states under a control of said control means.

In accordance with another aspect of the present invention, there is provided a method of controlling recording in accordance with shaking of a camcorder, comprising the steps of: (a) setting reference count values of first and second counters; (b) resetting said first and second counters if count value of said first counter has been arrived at the reference value of said first counter and then returning the operation to the initial state; (c) comparing the current shaking state of the camcorder with the previous shaking state of the camcorder if the count value of said first counter has not been arrived at the reference value of said first counter; and (d) comparing count value of said second counter with the reference value of said second counter with respect to the shaking state of the camcorder at said step (c), temporarily stopping the operation of the camcorder in accordance with the compared result and then returning the operation to the initial state.

BRIEF DESCRIPTION OF THE DRAWINGS

The above and other objects, features and advantages of the present invention will be more clearly understood from the following detailed description taken in conjunction with the accompanying drawings, in which:

FIG. 3*c* includes a view illustrating a connection of the mercury lead switch, which is at its inclined state in the shaking sensing means shown in FIG. 2, with a microcomputer.

DETAILED DESCRIPTION OF PREFERRED EMBODIMENTS

First, a construction of a control apparatus for stopping temporarily the operation of a camcorder in accordance with the present invention will be described with reference to FIG. 2.

Figure 1:
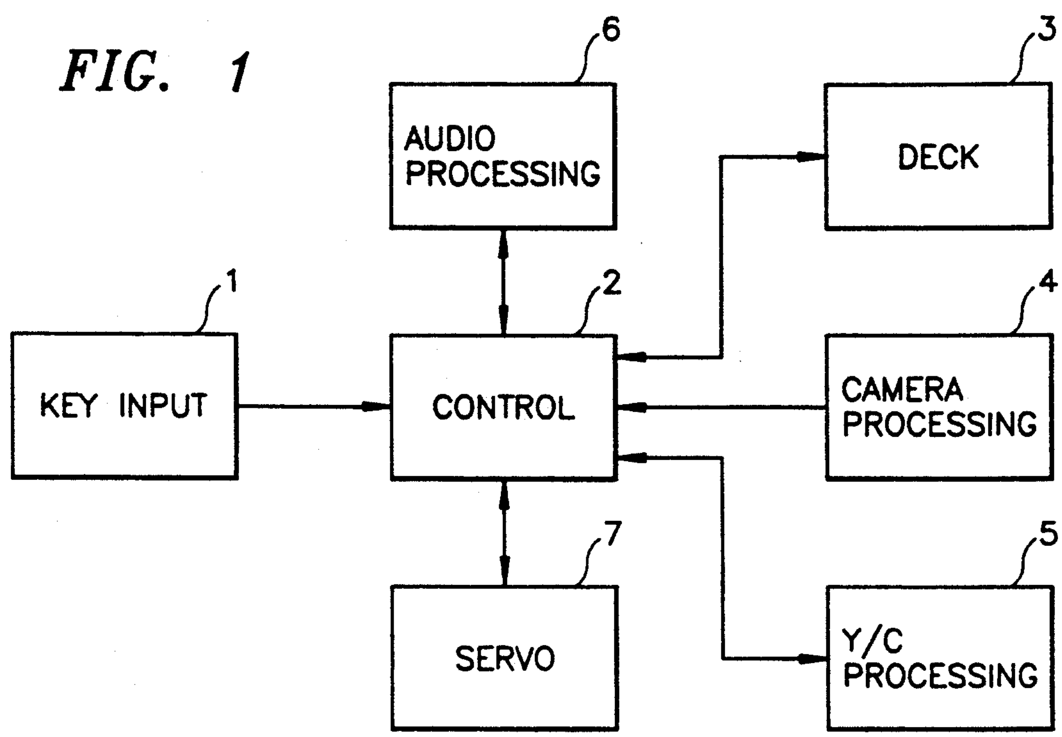
FIG. 1 is a block diagram of a conventional control apparatus for stopping temporarily the operation of a camcorder.
Figure 2:
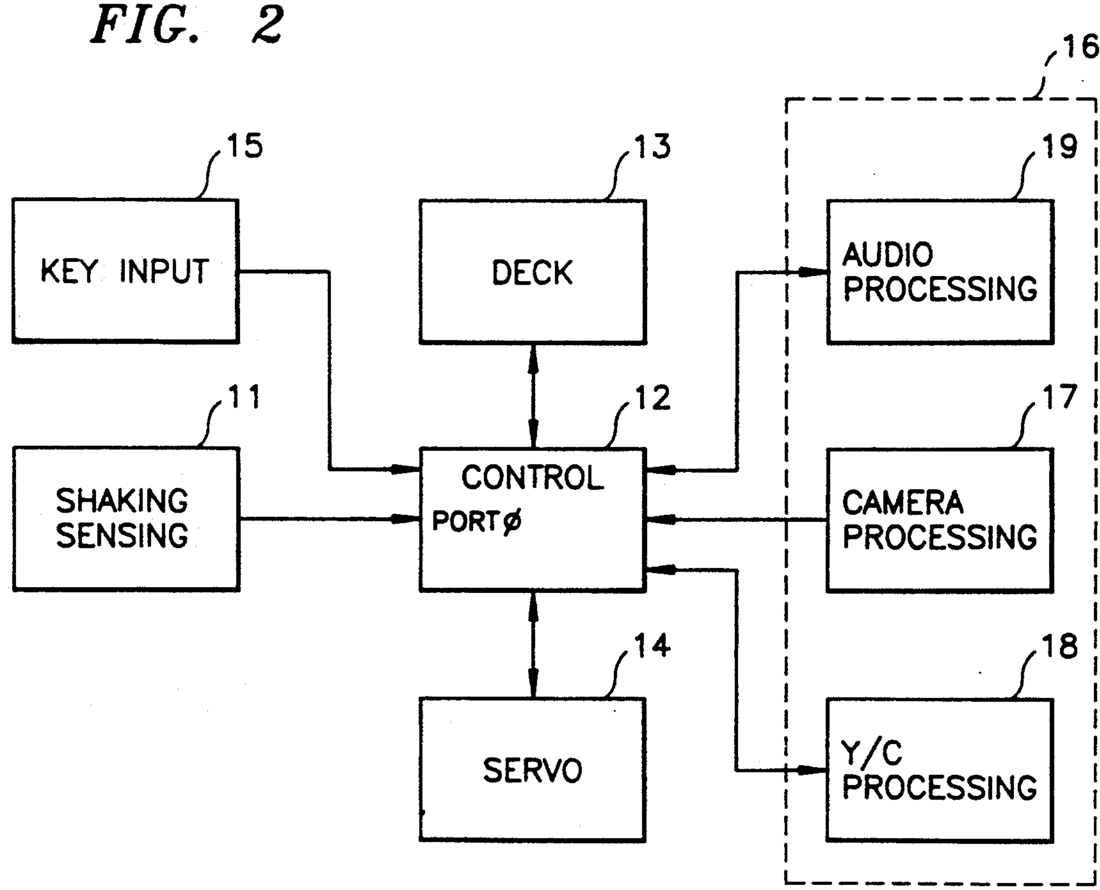
FIG. 2 is a block diagram of a control apparatus for stopping temporarily the operation of a camcorder in accordance with the present invention.

With reference to FIG. 2, there is shown a block diagram of the control apparatus for stopping temporarily the operation of the camcorder in accordance with the present invention. As shown in this drawing, the control apparatus of the present invention comprises shaking sensing means 11 for sensing shaking of the camcorder and outputting a signal in accordance with the sensed result, key input means 15 for inputting a key signal, corresponding to an operation mode of the camcorder, being selected by the user, control means 12 for outputting a plurality of control signals in response to output signals from the shaking sensing means 11 and the key input means 15, deck means 13 for controlling loading/unloading of a VCR tape in accordance with an output signal from the control means 12, servo means 14 for controlling traveling of the VCR tape in accordance with an output signal from the control means 12, and image and audio processing means 16 for changing image and audio signals being inputted therein to recordable states in accordance with output signals from the control means 12. Herein, the image and audio processing means 16 includes camera processing means 17, Y/C processing means 18 and audio processing means 19.

Now, the operation of the control apparatus with the above-mentioned construction in accordance with the present invention will be described in detail with reference to FIGS. 3*a* through 3*d* and 4.

First, if the key input means 15 inputs a key signal corresponding to the recording mode being selected by the user, the recording operation of the camcorder is performed. If the camcorder is shaken during performing of the recording operation, the shaking of the camcorder is sensed by a mercury lead switch 20 in the shaking sensing means 11, which is vertically mounted on the central horizontal line of the camcorder. The mercury lead switch 20 in the shaking sensing means 11 upon sensing the shaking of the camcorder outputs a shaking sensing signal to input terminal PORT$\phi$ of a microcomputer **12*a* in the control means 12. Upon receiving the shaking sensing signal from the mercury lead switch 20 in the shaking sensing means 11, the microcomputer 12*a* in the control means 12** controls the recording temporary stop operation of the camcorder in accordance with the inputted shaking sensing signal.

On the other hand, in a case where the camcorder is inclined somewhat to take the scene, the recording temporary stop mode operation of the camcorder is performed only when the mercury lead switch 20 repeats its ON/OFF operations by a predetermined number of times for a predetermined time, for the purpose of preventing the microcomputer **12*a*** from regarding the inclined state of the camcorder as the error recording and stopping temporarily the recording mode operation of the camcorder in accordance with the regarded result. In the preferred embodiment of the present invention, the predetermined time is n seconds and the predetermined number of times is n/2.

Figure 3:
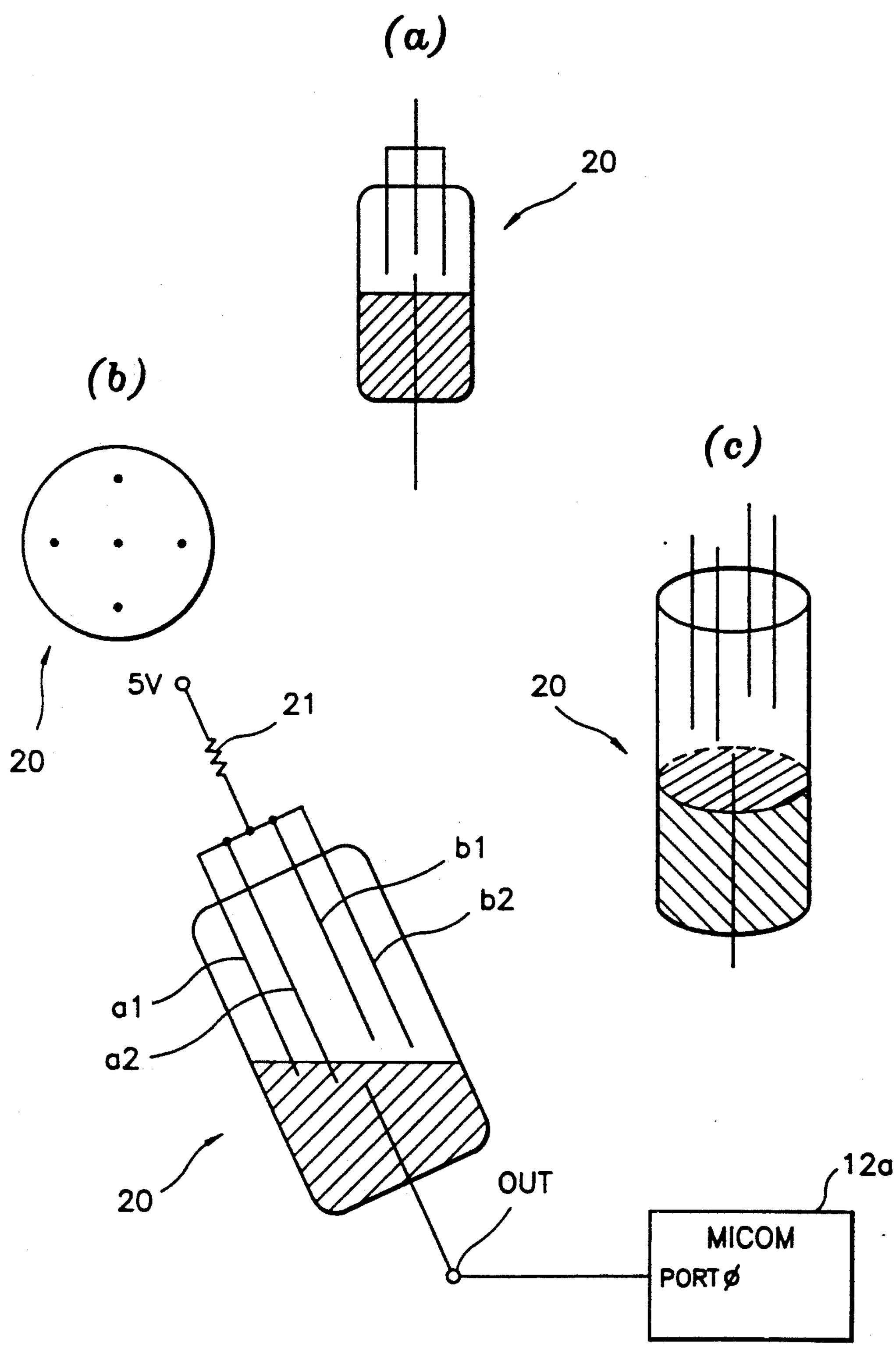
FIG. 3*a* is a front view of a mercury lead switch which is maintained at its vertical state in a shaking sensing means shown in FIG. 2.
FIG. 3*b* is a plan view of the mercury lead switch which is maintained at its vertical state in the shaking sensing means shown in FIG. 2.
FIG. 3*c* includes a perspective view of the mercury lead switch which is maintained at its vertical state in the shaking sensing means shown in FIG. 2.

As a result, the mercury lead switch 20 is maintained at its open state as shown in FIGS. 3*a* and 3*c* when the camcorder normally takes the scene, while is closed as shown in FIG. 3*d* when the camcorder is inclined due to its shaking. Namely, when the camcorder is inclined because of its shaking, in the mercury lead switch 20, lead terminals a1 and a2 or b1 and b2 are connected to output terminal OUT due to physical properties of the mercury. Then, a source voltage (5V in the preferred embodiment of the present invention) being applied via a pull-up resistor 21 is applied to the shaking sensing port PORT$\phi$ of the microcomputer **12*a* through the output terminal OUT of the mercury lead switch 20, so that the microcomputer 12*a*** controls the temporary stop mode operation of the camcorder.

Figure 4:
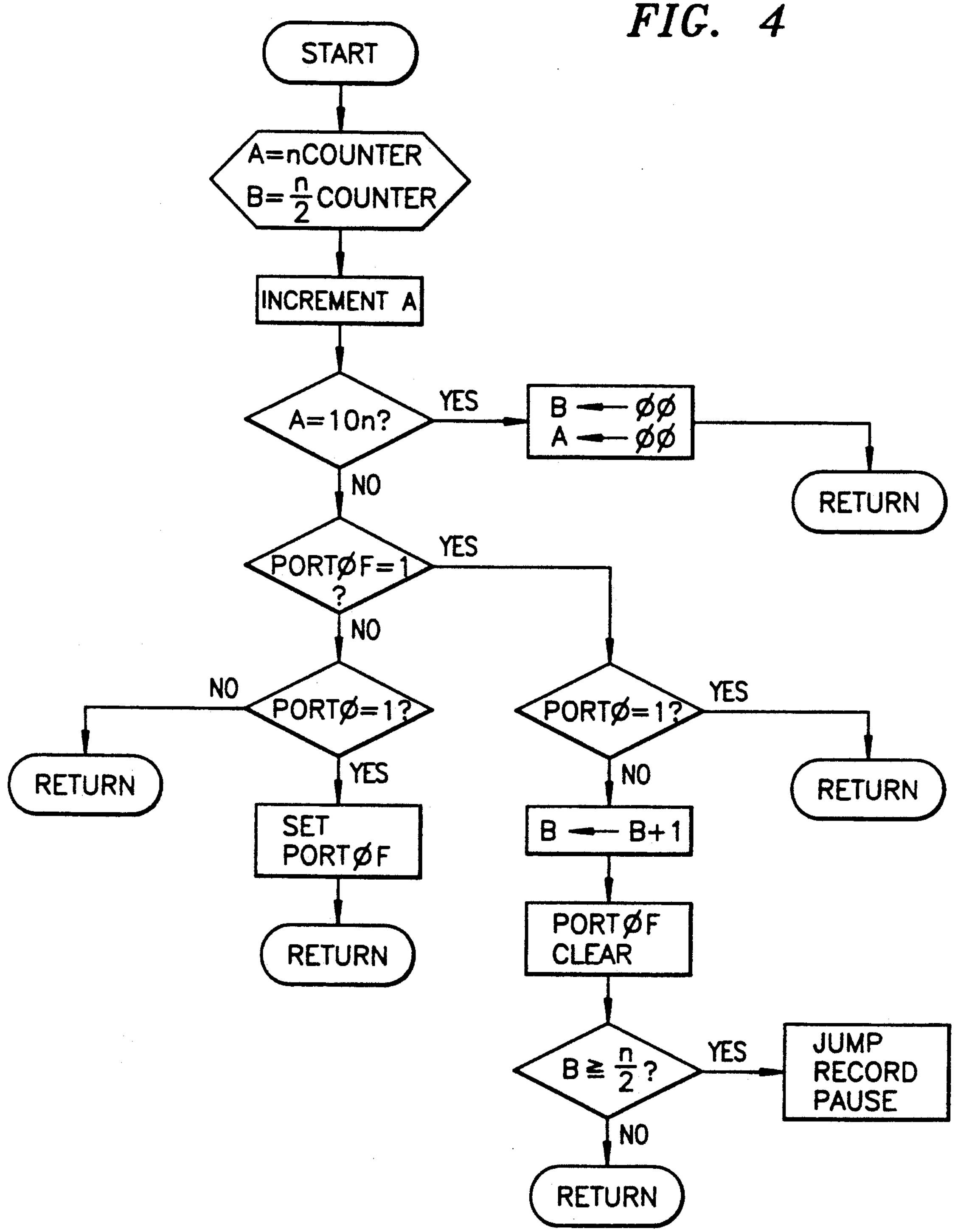
FIG. 4 is a flowchart illustrating the operation of the control apparatus for stopping temporarily the operation of the camcorder in accordance with an embodiment of the present invention.

With reference to FIG. 4, there is shown a flowchart illustrating the operation of the control apparatus for stopping temporarily the operation of the camcorder in accordance with an embodiment of the present invention. More particularly, this flowchart of FIG. 4 illustrates a subroutine program being performed every a predetermined time (100 msec in the preferred embodiment of the present invention). The shaking sensing port PORTϕ of the microcomputer 12*a* becomes a low level when the mercury lead switch 20 is Off, i.e., when the mercury lead switch 20 is not shaken, while becomes a high level when the mercury lead switch 20 is On, i.e., when the mercury lead switch 20 is shaken. Herein, the low level is binary "0" (0V) and the high level is binary "1" (5V).

Herein, there are provided counters A and B for counting the predetermined time and the predetermined number of times respectively with respect to the ON/-OFF operations of the mercury lead switch 20. Reference values of the counters A and B are preset such that the reference value of the counter B is no more than that of the counter A. In the preferred embodiment of the present invention, the reference value of the predetermined time counter A is n sec and the reference value of the predetermined number of times counter B is n/2 times.

If the count value of the predetermined time counter A is sequentially incremented to the reference value of the predetermined time, i.e., A=10n, the counters A and B are reset to the initial values.

If the count value of the counter A has not been arrived at the reference value of the counter A, the previous shaking state of the camcorder is in sequence compared with the current shaking state of the camcorder. That is, it is determined whether the shaking sensing port of the microcomputer 12*a* with respect to the previous shaking state of the camcorder is the high level (PORTϕF="1") or the low level (PORTϕF="0"), because of inclination of the camcorder. Then, the current inclination of the camcorder is determined only when the camcorder has not been shaken previously. At this time, if the shaking sensing port of the microcomputer 12*a*with respect to the previous shaking state of the camcorder is the low level (PORTϕF="0") because of no inclination of the camcorder and the shaking sensing port of the microcomputer 12*a* with respect to the current shaking state of the camcorder is the low level (PORTϕ="0"), the operation is returned directly to the initial state. This means no shaking of the camcorder.

On the other hand, if the shaking sensing port of the microcomputer 12*a* with respect to the previous shaking state of the camcorder is the low level (PORTϕF="0") because of no inclination of the camcorder and the shaking sensing port of the microcomputer 12*a* with respect to the current shaking state of the camcorder is the high level (PORTϕ="0"), this means that the camcorder is shaken. As a result, the current state value of the camcorder is set to the previous state value and the operation is then returned to the initial state for performing of a main program.

Also, if the shaking sensing port of the microcomputer 12*a* with respect to the previous shaking state of the camcorder is the high level (PORTϕF="1") because the camcorder has previously been inclined under the condition that the count value of the counter A has not been arrived at the reference value of the counter A, it is determined whether the shaking sensing port PORTϕ of the microcomputer 12*a* with respect to the current shaking state of the camcorder is the high level. This means that the camcorder continues to be shaken if the level state is changed because of another shaking of the camcorder. If another shaking of the camcorder is not present, this is regarded as that the camcorder is temporarily shaken, or that the camcorder is inclined to take the scene. As a result, the shaking sensing port PORTϕ of the microcomputer 12*a* becomes the high level (PORTϕ="1") and the operation is thus returned to the initial state.

At this time, if the shaking sensing port PORTϕ of the microcomputer 12*a* is turned into the low level (PORTϕ="0") because the camcorder continues to be shaken, the count value of the counter B is incremented, the sensing port flag PORTϕF of the camcorder is reset and the incremented count value of the counter B is detected. If the detected count value of the counter B is below the present reference value of the counter B, the operation is returned to the initial state for performing of the main routine. On the other hand, if the detected count value of the counter B is above the preset reference value of the counter B, the recording mode operation of the camcorder is temporarily stopped and the operation is then returned to the initial state. As a result, the recording operation of the camcorder is automatically temporarily stopped only when the error recording due to the shaking of the camcorder is sensed.

As hereinbefore described, in accordance with the present invention, there is provided the camcorder which is capable of sensing its shaking number of times by means of the shaking sensing means when the user moves the camcorder to take the next scene, with failing to select the temporary stop mode through his or her carelessness, regarding it as the error recording that the sensed shaking number of times is beyond a predetermined reference number of times and automatically stopping its operation temporarily in accordance with the regarded result. Therefore, the recording operation of the camcorder is not stopped temporarily when the camcorder is temporarily shaken during filming or is maintained at its inclination state to take the scene, but is temporarily stopped only when the camcorder is shaken severely and repeatedly.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is

1. A camcorder comprising:

shaking sensing means for sensing shaking of the camcorder and outputting a signal in accordance with the sensed result;

key input means for inputting a key signal, corresponding to an operation mode of the camcorder, being selected by a user;

control means for detecting a present condition of said key input means and said shaking sensing means and outputting a plurality of control signals in response to signals received from said shaking sensing means and said key input means;

deck means for controlling the loading/unloading of a VCR tape, said deck means having one or more control lines electrically connected to said control means, said deck means loading/unloading the VCR tape in response to one or more signals generated by said control means;

image processing means for changing an image signal being input to the image processing means to an image which is suitable for recording on a VCR tape, said image processing means having one or more control lines electrically connected to said control means, said image processing means modifying, adjusting, and otherwise manipulating the image input to said image processing means in response to one or more signals generated by said control means; and audio processing means for changing an audio signal being input to the audio processing means to an audio format which is suitable for recording on a VCR tape, said audio processing means having one or more control lines electrically connected to said control means, said audio processing means modifying, adjusting, and otherwise manipulating the audio input to said audio processing means in response to one or more signals generated by said control means.

2. A camcorder as set forth in claim 1, wherein said shaking sensing means includes a mercury lead switch.

3. A camcorder as set forth in claim 2, wherein said mercury lead switch is vertically mounted on a central horizontal line of the camcorder.

4. A method of controlling recording in accordance with shaking of a camcorder, comprising the steps of:

setting a reference count value of a first counter;

setting a reference count value of a second counter that is a fraction of the reference count value of the first counter;

incrementing the value of said first counter in accordance with a predetermined time interval;

evaluating the counter of said first counter and determining whether the count of said first counter has exceeded or equalled a multiple of the reference count value of the first counter;

resetting said first counter and said second counter, and returning control to the step of incrementing the first counter, if the count value of said first counter has exceeded or equalled the multiple of the reference count value of said first counter;

determining a prior shaking state value of the camcorder indicative of prior movement of the camcorder, wherein the prior shaking state value is alternately set at a high level and a low level;

determining a current shaking state value of the camcorder indicative of current movement of the camcorder, wherein the current shaking state value is alternately set at a high level and a low level;

if the prior shaking state value is at the low level and the current shaking state value is at the low level, returning control to the step of incrementing the first counter;

if the prior shaking state value is at the low level and the current shaking state value is at the high level, setting the prior shaking state value to equal the current shaking state value and returning control to the step of incrementing the first counter;

if the prior shaking state value is at the high level and the current shaking state value is at the low level, incrementing the second counter, setting the prior shaking state value to the low level, and determining the count value of said second counter;

wherein if the count value of said second counter is greater than or equal to the reference count value of the second counter, operation of the camcorder is halted; and wherein if the count value of said second counter is less than the reference count value of the second counter, returning control to the step of incrementing the first counter; and if the prior shaking state value is at the high level and the current shaking state value is at the high level, returning control to the step of incrementing the first counter.

5. A method controlling recording in accordance with shaking of a camcorder as set forth in claim 4 in which halting operation of the camcorder includes transmitting one or more signals to a deck means.

6. A method of controlling recording in accordance with shaking of a camcorder as set forth in claim 4 and further comprising the steps of:

determining whether the count value of said first counter exceeds or equals the reference value of said first counter;

it the count value of said first counter has not equalled or exceeded the reference value of said first counter, monitoring an orientation switch located in said camcorder and determining whether the camcorder is presently inclined;

storing one or more bits of data indicating whether the camcorder is inclined;

recalling stored information indicating whether the camcorder has previously been inclined;

setting the current state value of the camcorder to a value equal to the previous state value of the camcorder if the camcorder was not previously inclined, and is now inclined.

7. A camcorder as set forth in claim 1 and further comprising at least one signal means output by said control means causing the camcorder to halt recording.

8. A camcorder capable of detecting camcorder shake, comprising:

a camcorder including a record mode;

keying means for placing said camcorder in a record mode;

detecting means for detecting shaking events of said camcorder;

counting means for counting the number of shaking events detected by said detecting means;

disable means for disabling the recording operation of said camcorder; and control means for determining whether an excessive number of counts of said counting means have occurred during a predetermined period of time, and activating said disable means if said excessive number of counts of said counting means have occurred.

9. The camcorder of claim 8 in which said control means includes a reference counter for determining the passage of time.

10. The camcorder of claim 8 in which said counting means is reset after a pre-determined period of time.

11. The camcorder of claim 8 in which said camcorder further includes an orientation detection means for determining the inclination of the camcorder, and in which said control means determines whether the orientation of said camcorder has changed, and adjusts the number of shaking events permitted within the time period before determining whether an excessive number of shaking events have occurred.

* * * * *